(12) United States Patent
Fujiwara

(10) Patent No.: US 6,358,170 B1
(45) Date of Patent: Mar. 19, 2002

(54) POWER TRANSMISSION BELT

(75) Inventor: Katsuyoshi Fujiwara, Kobe (JP)

(73) Assignee: Bando Chemical Industries Ltd., Kobe (JP)

( * ) Notice: Subject to any disclaimer, the term of this patent is extended or adjusted under 35 U.S.C. 154(b) by 0 days.

(21) Appl. No.: 09/537,801

(22) Filed: Mar. 29, 2000

(30) Foreign Application Priority Data

Mar. 29, 1999 (JP) ............................................. 11-086663

(51) Int. Cl.⁷ .............................. F16G 1/00; F16G 5/00; F16G 1/02
(52) U.S. Cl. ........................................ 474/264; 474/271
(58) Field of Search ................................ 474/260–265, 474/268, 266, 205, 202, 204, 237, 271, 191; 524/397, 426; 526/160, 161, 172; 427/388.1, 389.9, 391

(56) References Cited

U.S. PATENT DOCUMENTS

| 5,161,677 A | * | 11/1992 | Beecher ................... 474/260 X |
| 5,223,311 A | * | 6/1993 | Tsutsumi et al. ......... 427/388.1 |
| 5,322,479 A | * | 6/1994 | Le Devehat ............. 474/265 X |
| 5,610,217 A | | 3/1997 | Yarnell et al. ............... 524/397 |
| 5,986,029 A | * | 11/1999 | van Beek et al. ........... 526/160 |
| 6,132,328 A | * | 10/2000 | Kinoshita et al. ........... 474/260 |

* cited by examiner

*Primary Examiner*—David A. Bucci
*Assistant Examiner*—Marcus Charles
(74) *Attorney, Agent, or Firm*—Connolly Bove Lodge & Hutz

(57) ABSTRACT

A power transmission belt having as the main constituent a rubber composition which comprises not less than 50% by weight, on the total polymer component basis, of an ethylene/α-olefin/diene terpolymer with sulfur incorporated therein as a curing or vulcanizing agent.

4 Claims, 3 Drawing Sheets

POWER TRANSMISSION BELT

FIELD OF THE INVENTION

The present invention relates to a power transmission belt or drive belt which has good heat resistance and low temperature resistance, together with high reliability.

BACKGROUND OF THE INVENTION

Power transmission belts are widely used in automobiles and for general industrial use, among others, as frictional belts for power transmission, such as a wrapped molded V-belt, a raw-edged V-belt and like V belts and V-ribbed belts, and further as engaging belts for power transmission, such as timing belts.

Such a power transmission belt is generally constituted of an adhesive rubber layer with core wires embedded therein, and a bottom rubber layer overlaid with said adhesive rubber layer, if necessary together with an upper canvas and/or a lower canvas as adhered to the respective layers.

It is thought that the most effective measure for prolonging the life of a power transmission belt is to improve the same with respect to the life thereof in a high temperature atmosphere in which rubber degradation is markedly accelerated. To cope with the conditions of environment under which it is used, a rubber species showing good flexibility at low temperatures is demanded.

So far, natural rubber (NR), styrene/butadiene copolymer rubber (SBR), chloroprene rubber (CR), hydrogenated nitrile/butadiene rubber (H-NBR) and alkylated chlorosulfonated polyethylene (ACSM) have been widely used as the rubber constituting the adhesive layer and bottom rubber layer of such a power transmission belt.

Among such rubbers, natural rubber and styrene/butadiene copolymer rubber have good low temperature resistance but are inferior in heat resistance to chloroprene rubber. On the other hand, hydrogenated nitrile/butadiene rubber and alkylated chlorosulfonated polyethylene have good heat resistance but are inferior in low temperature resistance to chloroprene rubber. Thus, chloroprene rubber is superior in both heat resistance and low temperature resistance to the other rubbers mentioned above and therefore is generally used as the rubber for power transmission belts.

As a rubber superior in both heat resistance and low temperature resistance to chloroprene rubber, there may be mentioned, for example, epichlorohydrin rubber. However, when this rubber is used in belts, a problem arises; namely, slipping occurs on pulleys and this slipping causes the rubber to soften, whereupon a tacky matter forms in large quantities.

Meanwhile, Japanese Kohyo Publication Hei-09-500930 discloses a belt the rubber component of which is a cured composition comprising ethylene/propylene copolymer rubber (EPM) and/or an ethylene/propylene/diene terpolymer (EPDM), an α, β unsaturated carboxylic acid salt, an organic peroxide and other additives.

Such ethylene/propylene/diene termpolymer is superior in heat resistance and low temperature resistance to chloroprene rubber and, furthermore, is characterized in that even when slipping occurs, the rubber itself will not soften; hence the life of said belt is long.

Thus, the conventional belt produced by using an ethylene/propylene/diene terpolymer is excellent in the heat resistance in a range of high temperature where the degradation of rubber dominates the life of the belt and, at the same time, is almost comparable in life span to chloroprene rubber even in the temperature range of 20° C. to 80 ° C. in which the flexural fatigue of rubber determines the life of the belt. In the ordinary mode of use in which the power transmission belt is most frequently used at about 20° C. to 80° C., the life of a belt comprising said terpolymer does not differ from that of a chloroprene rubber belt barring exceptionally severe conditions.

However, the ethylene/propylene/diene terpolymer belt has problems; once a tiny crack has appeared in the production process, during transportation or in the step of mounting, for instance, the crack immediately widens, leading to belt destruction. Thus, early failure has occurred frequently.

During use thereof as well, when an impact is given to said belt, for example by inclusion of a foreign matter between the belt and a pulley or by a rusted pulley, cracking tends to occur. Once formed, a crack immediately progresses, leading to destruction of the belt, so that said belt is lacking in reliability as compared with chloroprene rubber which is slow in the progression of cracks.

SUMMARY OF THE INVENTION

In view of the foregoing, the present invention has for its object to provide a power transmission belt having good heat resistance and low temperature resistance and showing only slight variation in life owing to slow crack development and, further, showing high reliability.

The present invention consists in a power transmission belt the main constituent rubber composition of which comprises not less than 50% by weight, on the total polymer component basis, of an ethylene/α-olefin/diene terpolymer with sulfur incorporated therein as a curing or vulcanizing agent.

DETAILED DESCRIPTION OF THE INVENTION

Figure 1:
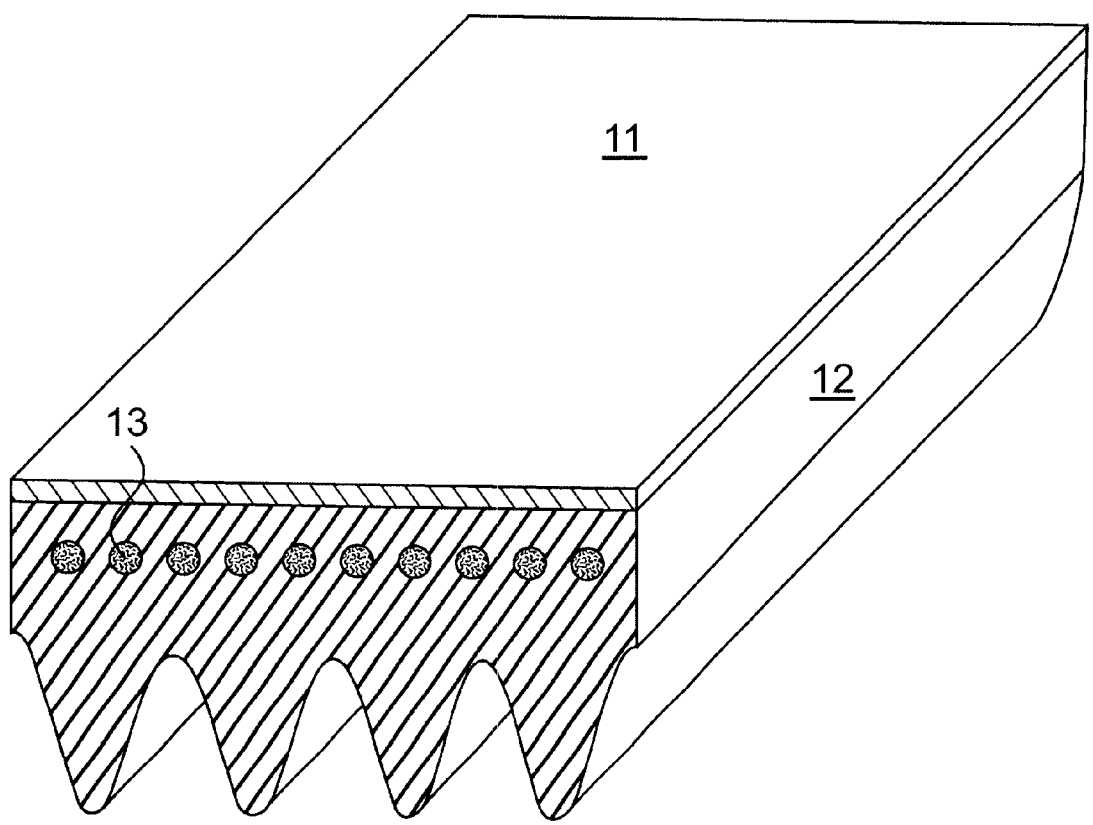
FIG. 1 is a schematic perspective view, partly in section, of a part of a V-ribbed belt, a species of the power transmission belt of the present invention.

In the figures, the respective reference numbers indicate the following: 1—drive pulley, 2—driven pulley, 3 and 4—each idler pulley, 5—V belt, 11—canvas, 12—rib rubber, and 13—core wire.

In the power transmission belt of the present invention, a rubber composition comprising not less than 50% by weight, on the total polymer component basis, of an ethylene/α-olefin/diene terpolymer is used as the main rubber constituting the belt.

When the content of said ethylene/α-olefin/diene terpolymer is less than 50% on the total polymer basis, the heat resistance and low temperature resistance, among others, are insufficient, resulting in a markedly reduced life of the belt until cracking. The above range is critical.

The above ethylene/α-olefin/diene terpolymer is not particularly restricted but includes terpolymers constituted of ethylene, an α-olefin and a diene, the latter two being selected from among various species.

Said α-olefin includes, among others, propylene, 1-butene, 1-pentene, 1-hexene, 1-octene and the like. Said diene includes, among others, 1,4-hexadiene, dicyclopentadiene, 5-ethylidene-2-norbornene and the like.

An ethylene/propylene/diene terpolymer (EPDM) is preferred among others.

The content of the diene component in the above ethylene/α-olefin/diene terpolymer is preferably within the range of 3 to 10% by weight.

When the content of said diene is less than 3% by weight, a sufficient crosslink density cannot be obtained by sulfur curing but the belt may show increased wear or the powder formed by abrasion may aggregate. When, conversely, said diene component content is in excess of 10% by weight, sufficient heat resistance cannot be obtained but the terpolymer shows poor rubber characteristics.

The other polymer to be contained in said rubber composition is not particularly restricted but includes, among others, chloroprene rubber, epichlorohydrin rubber, silicone rubber, natural rubber, ethylene/vinyl acetate copolymer, acrylic rubber, styrene/butadiene copolymer (HSR), styrene/butadiene copolymer rubber (SBR), hydrogenated nitrile/butadiene rubber (H-NBR), alkylated chlorosulfonated polyethylene (ACSM), ethylene/propylene copolymer rubber (EPM), nitrile rubber and resinous substances.

In particular, a resinous substance having a softening point within the range of 60° C. to 140° C. is preferably used. Such resinous substance can absorb the strain energy generated upon deformation of rubber at a temperature below said softening point even in the case of a tiny crack appearing, thus reduce the stress in the vicinity of the crack and thereby prevent the crack from widening. Said resinous substance means, in this specification, substances comprising a resin and used for the purpose of increasing tackiness on the surface of the composition, and may be substances which are usually used as a tackifier.

As such resinous substance, there may be mentioned, for example, coumarone-indene resin and petroleum resins.

Said resinous substance is used preferably in an amount of 1 to 15 parts by weight per 100 parts by weight of the sum of other polymer components than said resinous substance.

When said resin is used in an amount less than 1 part by weight, the preventive effect on crack development is insufficient. When it is used in an amount exceeding 15 parts by weight, the rubbery elastomer characteristics become weakened.

In the main rubber composition of the present invention, a rubber composition with sulfur incorporated therein as a curing agent is used.

The level of addition of sulfur is preferably 0.6 to 3.5 parts by weight per 100 parts by weight of the combined polymer components.

When the amount of sulfur is less than 0.6 part by weight, the rate of development of a crack in rubber is accelerated and, in addition, wear increases. When said amount is in excess of 3.5 parts by weight, the heat resistance of rubber is weakened, hence a sufficient life cannot be obtained and, in addition, blooming occurs on the rubber surface; a power transmission belt having sufficient performance characteristics cannot be produced.

The reason why the conventional EPDM, which is used as the main rubber for power transmission belts, is susceptible to cracking is that minute air cells which appear and disappear and, thus, will not grow normally are allowed to grow as rubber becomes fatigued and serve as crack initiation sites, thus precipitating the spread of cracks. Such rapid spread of cracking is caused by rubber main chain cleavage by radicals formed at crosslink cleavage sites which are in turn formed by stress concentration at said sites upon stretching of rubber molecules by an external force because of short distances between crosslinking sites involved in crosslinking of polymer molecules, namely short crosslinks.

In the case of the present invention, however, when sulfur is used as the crosslinking agent for the ethylene/α-olefin/diene terpolymer, crosslinking is realized by means of a group consisting of a plurality of sulfur atoms linked together, namely —Sx—, and, therefore, even when said group consisting of a plurality of sulfur atoms is once cleaved by an external force, the front end S atom exposed by cleavage of said group can be bound to such S atom of another cleaved group. Thus, crosslinking site cleavage, even when caused, does not lead to main chain cleavage in many instances.

Therefore, the power transmission belt of the present invention can maintain predetermined or required strength characteristics and are highly resistant to cracking and, further, as a result of retarded growth of cracks, the formation of large cracks in the belt can be suppressed or prevented.

Furthermore, when, during use thereof, the belt is given a shock by a pulley catching a foreign matter or by a rusted pulley, the rate of crack spreading is retarded by the mechanism mentioned above and the life of the power transmission belt is thus prolonged.

The rubber composition constituting the power transmission belt of the present invention may contain, in addition to the above additives, one or more further additives selected from among fillers such as carbon black, calcium carbonate, talc, clay and silica; plasticizers such as process oil; antioxidants, waxes, pigments, softening agents and so forth.

The power transmission belt of the present invention includes those belts generally used as power transmission belts, without any particular limitation, for example V belts, V-ribbed belts, timing belts, flat belts and the like.

Specifically, the rubber composition comprising the above ethylene/α-olefin/diene terpolymer with sulfur incorporated therein as a curing agent is used at least as the bottom rubber of said V belts, the rib rubber of said V-ribbed belts, the tooth rubber of said timing belts, the skin or surface layer rubber of said flat belts, or the like.

The power transmission belt of the present invention, which has the constitution mentioned above, has good heat resistance and low temperature resistance and varies little in life because of retarded spread of cracks, and the reliability thereof is high.

EXAMPLES

The following examples illustrate the present invention in further detail. They are, however, by no means limitative of the scope of the present invention.

Example 1

According to the formulation shown below in Table 1, a rib rubber for a V-ribbed belt was prepared and then a V-ribbed belt was produced using said rib rubber as a constituent material.

FIG. 1 is a schematic perspective view, partly in section, of a part of said V-ribbed belt. It is constituted of the rib rubber 12 having core wires 13 made of nylon 66 and a canvas 11 overlaid on and adhered to said rib rubber.

TABLE 1

|  | Example 1 | Comp. Ex. 1 | Comp. Ex. 2 |
|---|---|---|---|
| EPDM | 100 | — | 100 |
| Chloroprene rubber | — | 100 | — |
| Stearic acid | 1 | 1 | 1 |
| Zinc oxide | 5 | 5 | 5 |
| Magnesium oxide | — | 4 | — |
| Antioxidant 1 | 0.5 | — | 0.5 |
| Antioxidant 2 | 2 | — | — |
| Antioxidant 3 | — | 2 | — |
| HAF carbon black | 55 | 45 | 55 |
| Softening agent | 10 | — | 10 |
| Sulfur (curing agent) | 1.5 | — | — |
| Percumyl D | — | — | 3 |
| Dioctyl sebacate (DOS) | — | 5 | — |
| Accelerator 1 | 0.4 | — | — |
| Accelerator 2 | 0.5 | — | — |
| Accelerator 3 | 0.5 | — | — |
| Accelerator 4 | 0.5 | — | — |
| Accelerator 5 | 0.3 | — | — |
| 66 Nylon | 25 | 25 | 25 |

Figure 2:
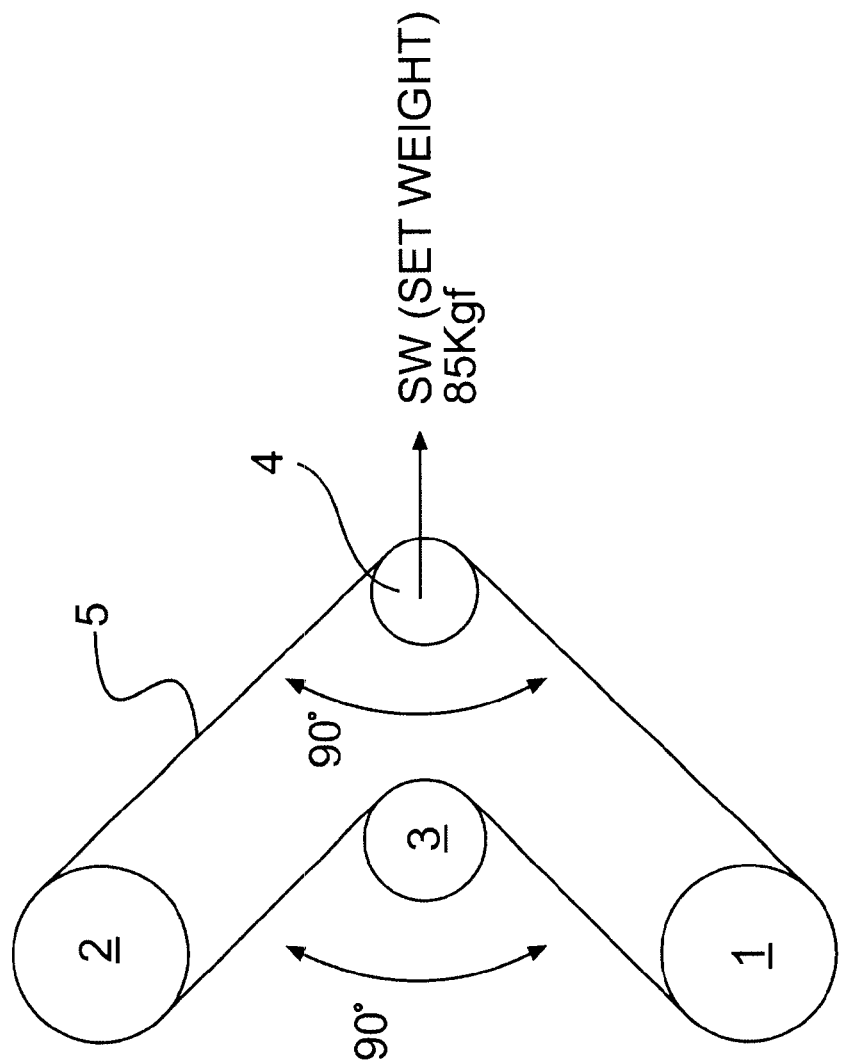
FIG. 2 is a schematic representation of the belt running test apparatus used in the examples to be mentioned later herein.

Notes:
EPDM: Japan Synthetic Rubber's EP 51
Chloroprene rubber: Du Pont's Neoprene GRT
Antioxidant 1: Ouchi Shinko Chemical's Nocrac 224
Antioxidant 2: Ouchi Shinko Chemical's Nocrac MB
Antioxidant 3: Ouchi Shinko Chemical's Nocrac PA
Accelerator 1: Ouchi Shinko Chemical's Nocceler TET
Accelerator 2: Ouchi Shinko Chemical's Nocceler M-G
Accelerator 3: Ouchi Shinko Chemical's Nocceler DM-G
Accelerator 4: Ouchi Shinko Chemical's Nocceler CZ-G
Accelerator 5: Sanshin Chemical's Sanceler 22C
Softening agent: Idemitsu Kosan's Diana Process PW-90
66 Nylon: 1.5 de × 3 mm This V-ribbed belt was subjected to accelerated evaluation on the belt running test apparatus shown in FIG. 2. Said test apparatus comprises a drive pulley 1, a driven pulley 2 and idler pulleys 3 and 4, and the V belt 5 is brought into contact with these pulleys. The drive pulley 1 and driven pulley 2 each has a diameter of 120 mm, the idler pulley 3 has a diameter of 70 mm and the idler pulley 4 has a diameter of 55 mm. The idler pulley 4 is pulled in the direction of the arrow under a load of 85 kgf, and the driven pulley 2 is placed under a load of 16 PS and caused to run at a revolving speed of 4,900 rpm in an atmosphere maintained at 85° C.

Figure 3:
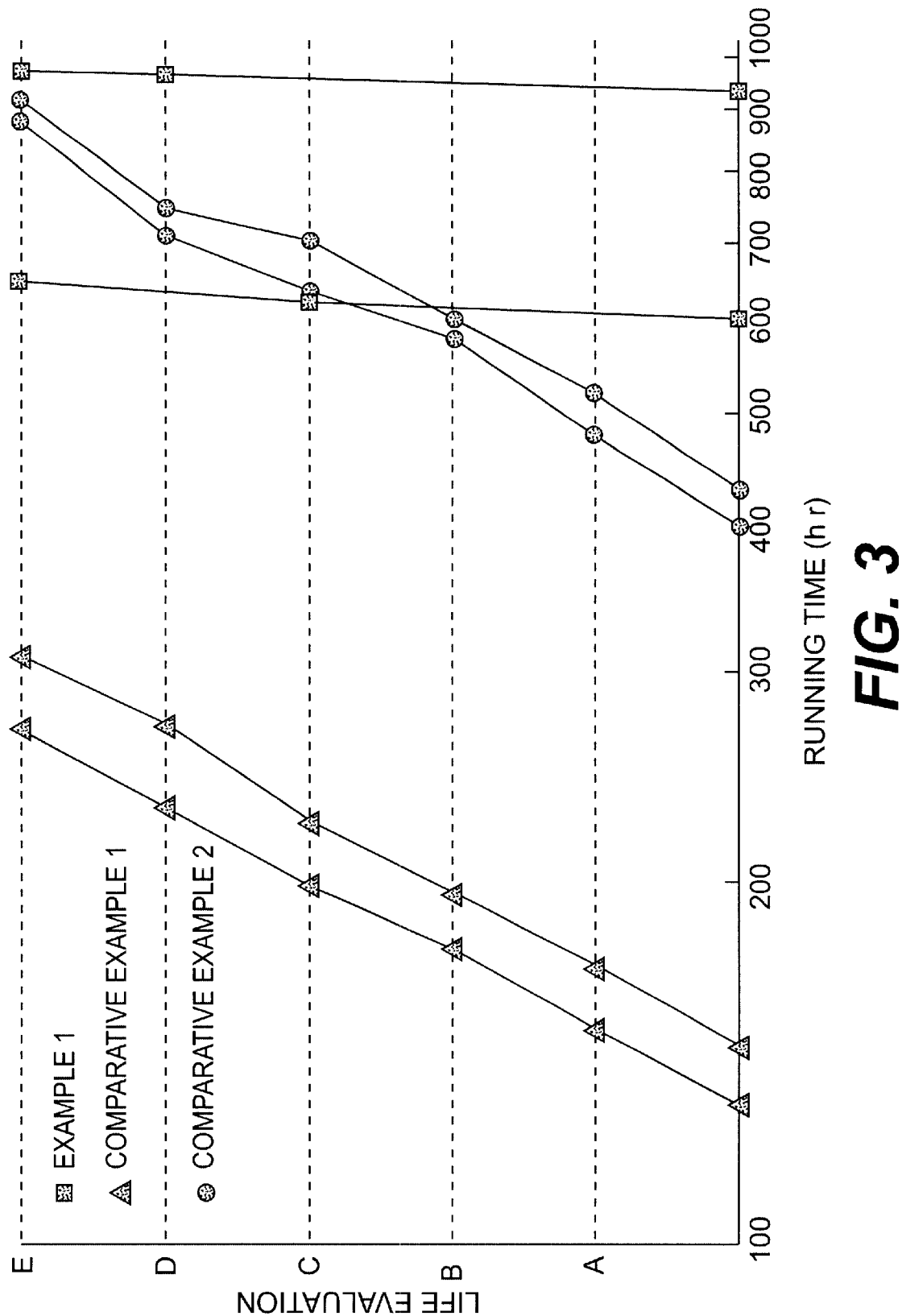
FIG. 3 is a graphic representation of the results obtained in Example 1 and Comparative Examples 1 and 2.

FIG. 3 shows the results, with the running time on the abscissa and the ranked life on the ordinate. The ranks of life on the ordinate are as follows: (1) A: appearance of a tiny crack at the rib end; (2) B: spread of the crack to the vicinity of the middle of the rib; (3) C: spread of the crack to the root of the rib; (4) D: spread of the crack to the core wire of the rib; (5) E: rib fracture or belt breakage.

As is evident from the results shown in FIG. 3, the V-ribbed belt of Example 1 in which the rubber composition comprising EPDM and sulfur (curing agent) is used in preparing the rib rubber shows a life about three times that of the V-ribbed belt of Comparative Example 1 in which chloroprene rubber is used as the rib rubber. The two V-ribbed belts produced according to Example 1 using the same rubber composition in preparing the respective rib rubbers differ little in life, without significant dispersion of life spans.

On the other hand, the V-ribbed belts of Comparative Example 2, in which a rubber composition comprising EPDM and an organic peroxide (curing agent: Percumyl D) is used in preparing the rib rubber are comparable to the belts of Example 1 with respect to life but, after appearance of a crack, they become unusable as belts in a very short period of time. The life greatly varies from product to product with significant dispersion.

The power transmission belt provided by the present invention and having the constitution mentioned above has good heat resistance and low temperature resistance and varies little in life because of retarded spread of cracks, and the reliability thereof is high.

What is claimed is:

1. A power transmission belt the main constituent rubber composition of which comprises not less than 50% by weight, on the total polymer component basis, of an ethylene/α-olefin/diene terpolymer with sulfur incorporated therein as a curing agent, said terpolymer having 3 to 10% by weight of the diene component.

2. A power transmission belt according to claim 1, wherein the sulfur is incorporated in an amount of 0.6 to 3.5 parts by weight per 100 parts by weight of the total polymer components.

3. A power transmission belt according to claim 1, wherein as resinous substance having a softening point within the range of 60° C. to 140° C. is further incorporated in an amount of 1 to 15 parts by weight per 100 parts by weight of the total polymer components other than said resinous component.

4. A power transmission belt according to claim 1, which occurs as a V-ribbed belt.

* * * * *